United States Patent [19]

Brzezicki et al.

[11] Patent Number: 4,665,960
[45] Date of Patent: May 19, 1987

[54] CODED COUPLING

[75] Inventors: Joseph M. Brzezicki, Novelty; Gerald A. Babuder, Mentor, both of Ohio

[73] Assignee: Cajon Company, Macedonia, Ohio

[21] Appl. No.: 708,040

[22] Filed: Mar. 4, 1985

[51] Int. Cl.⁴ .............................................. F16L 15/00
[52] U.S. Cl. .................................. 141/384; 141/386; 251/142; 285/18
[58] Field of Search ......... 251/142; 285/18, DIG. 15, 285/914; 339/186 M; 141/1, 9, 311 R, 346, 383, 384, 386

[56] References Cited

U.S. PATENT DOCUMENTS

| | | | |
|---|---|---|---|
| 1,842,897 | 1/1932 | Culp | 285/18 |
| 2,563,762 | 8/1951 | Uline et al. | 339/186 M |
| 3,077,571 | 2/1963 | Curtis et al. | 339/186 M |
| 3,096,135 | 7/1963 | Feustel et al. | 285/DIG. 15 |
| 3,288,494 | 11/1966 | Callahan, Jr. et al. | 285/14 |
| 3,337,181 | 8/1967 | Wennerstrom | 251/148 |
| 3,521,910 | 7/1970 | Callahan, Jr. et al. | 285/14 |
| 4,111,514 | 9/1978 | Brishka et al. | 339/186 R |
| 4,211,439 | 7/1980 | Moldestad | 285/27 |

FOREIGN PATENT DOCUMENTS 670440 9/1963 Canada .
771968 4/1957 United Kingdom .

Primary Examiner—Stephen Marcus
Assistant Examiner—Mark Thronson
Attorney, Agent, or Firm—Fay, Sharpe, Beall, Fagan, Minnich & McKee

[57] ABSTRACT

A coupling assembly having abutting surfaces held together in sealed relationship by cooperable male and female nuts includes a gland member having one of the abutting surfaces thereon and being receivable in the male nut. At least one inwardly extending projection on the male nut is receivable in an external longitudinal groove in that portion of the gland member which is receivable in the male nut. Couplings for different fluids have different projection and groove arrangements such that a male nut having a given projection arrangement will receive only a gland member having a matching groove arrangement.

17 Claims, 10 Drawing Figures

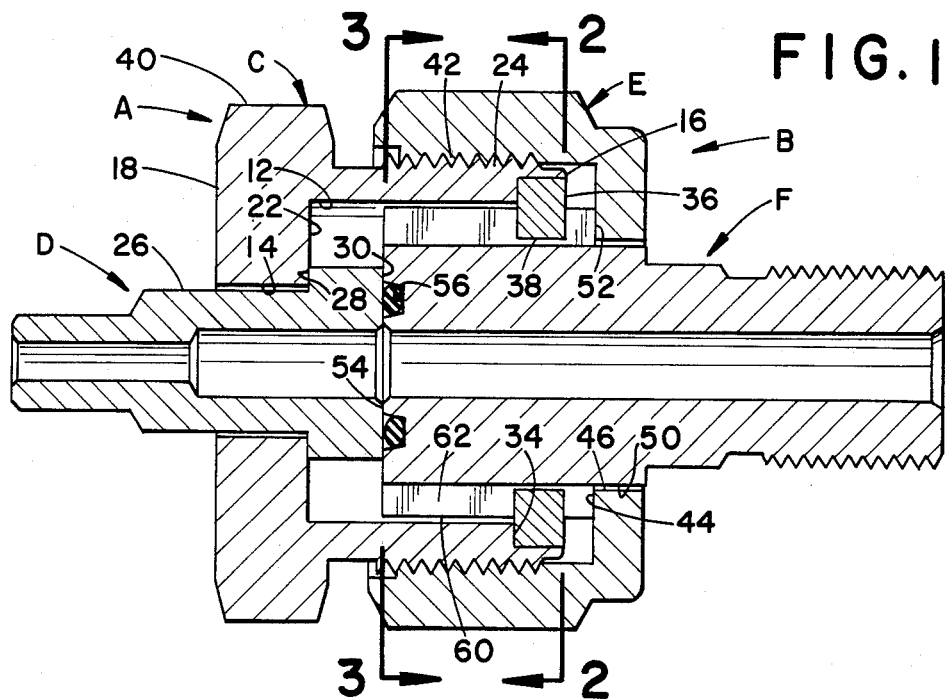
FIG. 1
FIG. 2
FIG. 3
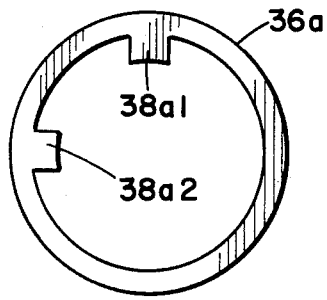
FIG. 4
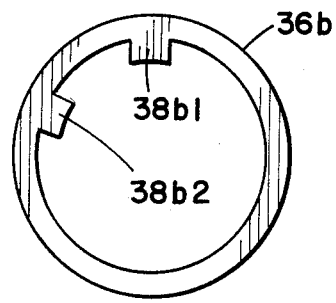
FIG. 5
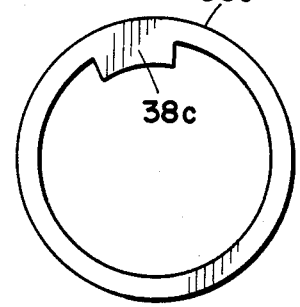
FIG. 6

CODED COUPLING

BACKGROUND OF THE INVENTION

This application relates to the art of couplings and, more particularly, to fluid couplings which are coded such that mating coupling parts intended for one fluid cannot be mated with coupling parts intended for other fluids. The invention is particularly applicable to couplings of the type in which abutting surfaces are held together in sealed relationship by cooperating male and female nuts. However, it will be appreciated that features of the invention have broader aspects, and may be used in other assemblies and for other purposes.

It is broadly known to provide couplings with coded arrangements such that one coupling part intended for one fluid cannot be mated with another coupling part intended for a different fluid. However, satisfactory arrangements of this type have not been available for couplings of the type having abutting surfaces held together in sealed fluid flow relationship by cooperating male and female nuts.

SUMMARY OF THE INVENTION

A coupling assembly having abutting surfaces held together in sealed fluid flow relationship by cooperating male and female nuts includes a gland member having one of the abutting surfaces on a portion thereof receivable in the male nut. The male nut has inwardly extending projection means adjacent its terminal end for reception in corresponding external axial groove means in that portion of the gland member receivable in the male nut. Different coupling assemblies intended for use with different gases have different arrangements of projections and grooves such that a coupling member intended for use with one fluid can be mated only with another coupling member also intended for use with the same fluid. Thus, a coupling member intended to convey one fluid cannot be mated with another coupling member intended for use with a different fluid.

In accordance with the present application, an externally threaded, generally tubular member has an inner peripheral surface and a free terminal end. A circumferential abutment surface within the generally tubular member surrounds a fluid passage, and is spaced inwardly from the inner peripheral surface and is spaced axially inwardly from the terminal end of the generally tubular member. Projection means adjacent the terminal end of the generally tubular member projects inwardly for cooperation with external axial groove means in a portion of a gland member receivable in the generally tubular member and having a gland abutment surface cooperable with the abutment surface in the generally tubular member. A gland member cannot be inserted into an externally threaded generally tubular member unless the projection means and groove means correspond.

The gland member carries an internally threaded female nut cooperably engageable with the external threads on the generally tubular member. The female nut and gland member have cooperable shoulders for moving the gland member axially to seal the gland abutment surface with the abutment surface within the generally tubular member when the female nut is tightened on the externally threaded, generally tubular member. In a preferred arrangement, the threads on the female nut and the generally tubular member cannot be engaged unless the projection means on the generally tubular member is received in the groove means on the gland member.

The projection means is on a ring member attached to the generally tubular member adjacent its terminal end. In a preferred arrangement, the generally tubular member has an internal circumferential recess therein adjacent its terminal end, and the ring member is secured within such recess.

In one arrangement, the generally tubular member is defined by a boss extending outwardly from a valve body and the internal abutment surface is integral with the valve body. In another arrangement, the generally tubular member is defined by a male nut and the internal abutment surface is on a portion of a separate gland member received in the male nut. In the latter arrangement, both the male and female nuts are movable rotatably and axially on their gland members, and this makes it possible to connect and disconnect the gland members with no substantial axial movement thereof.

The valve having the coded generally tubular member thereon is adapted for attachment to a portable reservoir of fluid with the generally tubular member extending substantially horizontally. A plurality of reservoirs of different fluids each have a different valve with a different code arrangement. A panel has a plurality of coupling members projecting substantially horizontally outward therefrom, and each coupling member has a different code arrangement. The code arrangements are such that only one valve can be coupled with each coupling member on the panel for preventing inadvertent connection of a reservoir to the wrong coupling member. The generally tubular members on the valves and the coupling members on the panel are at substantially the same height when the fluid reservoirs are resting on a common support surface. The coupling members on the panel are preferably non-rotatable and are secured in proper rotated positions when installed. As a result, the orientation of the code arrangement will match that on a valve when the reservoir is supported in upright position on the support surface.

A primary advantage of the subject invention is the provision of an improved coded coupling arrangement which is economical to manufacture, and is very reliable and simple to use.

Another advantage of the invention is the provision of such a coupling arrangement incorporated into a valve body.

It is a further advantage of the invention to provide a coded coupling arrangement for use with couplings of the type having abutting surfaces retained in sealed fluid flow relationship by cooperable male and female nut members.

Still another advantage of the invention is found in improved individual members and parts for a coded coupling arrangement of the type described.

Yet an additional advantage of the invention resides in an improved system for connecting a plurality of different fluid reservoirs to coupling members on a panel by providing the reservoirs and coupling members with the coded arrangement of the present application.

Still other advantages and benefits of the subject invention will become apparent to those skilled in the art upon a reading and understanding of the following detailed specification.

BRIEF DESCRIPTION OF THE DRAWINGS

The invention may take form in certain parts and arrangements of parts, preferred embodiments of which will be described in detail in this specification and illustrated in the accompanying drawings which form a part hereof and wherein:

FIG. 1 is a cross-sectional side elevational view of one embodiment of a coded coupling assembly constructed in accordance with the present invention;

FIG. 2 is a cross-sectional end elevational view of a male nut member taken generally along lines 2—2 of FIG. 1 and with portions omitted for ease of illustration;

FIG. 3 is a cross-sectional end elevational view of a gland member taken generally along lines 3—3 of FIG. 1 and with portions omitted for ease of illustration;

FIGS. 4-6 are end elevational views of ring members having different keying projection arrangements thereon;

DESCRIPTION OF PREFERRED EMBODIMENTS

Figure 7:
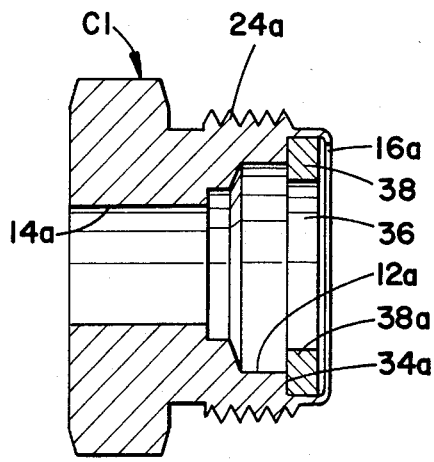
FIG. 7 is a side cross-sectional elevational view of a modified nut member.

Referring now to the drawings, wherein the showings are for purposes of illustrating certain preferred embodiments of the invention only and not for purposes of limiting same, FIG. 1 shows male and female coupling assemblies A,B connected together in cooperative relationship for providing fluid flow therethrough.

Male coupling assembly A includes a male nut C which also defines a generally tubular member having a central through passage defined by concentric large and small diameter bores 12,14, respectively, opening outwardly at first and second terminal ends 16,18. First terminal end 16 also defines an outer or free terminal end of generally tubular member C. Large and small diameter cylindrical bores 12,14 intersect at an internal radial shoulder 22 which faces outwardly toward first terminal end 16. Generally tubular member C has external threads 24 extending along at least a portion thereof outwardly of large diameter bore 12.

A generally tubular first gland member D having a fluid passage therethrough includes an outer cylindrical portion 26 closely received through small diameter bore 14 and having an axial length substantially greater than small diameter bore 14. An outwardly extending gland shoulder 28 is engageable with shoulder 22 inside of generally tubular member C. First gland member D has an abutment surface 30 located inside of generally tubular member C and facing outwardly toward first terminal end 16. Gland abutment surface 30 is spaced axially inward from first terminal end 16 and radially inward from the peripheral wall of large diameter bore 12. Shoulder 22 also defines the bottom of large diameter bore 12 and gland abutment surface 30 is spaced outwardly from shoulder 22.

Generally tubular member C is provided with an inner circumferential groove 34 adjacent first terminal end 16 for closely receiving a circular ring member 36 having inwardly extending projecting means in the form of at least one projection 38 thereon. Projection 38 extends inwardly of large diameter bore 12 and terminates short of gland abutment surface 30. Circumferential recess 34 preferably is dimensioned such that ring member 36 is substantially flush with first terminal end 16 as shown in FIG. 1. Ring member 36 preferably is non-rotatably secured in recess 34 as by brazing or welding. Although ring member 36 may comprise a single stamping or be formed by powdered metal techniques, it preferably is formed of two stacked stampings to provide strength.

Outer peripheral portion 40 of male nut C preferably is hexagonal or some other non-circular shape to facilitate being easily gripped by a wrench. Also, portion 40 has a substantially larger cross-sectional size than the portion of the male nut having external threads 24 thereon.

Female coupling assembly B includes a female nut E having internal threads 42 thereon cooperatively engageable with external threads 24 on male nut C. Female nut E has a generally radially extending inner shoulder 44 facing outwardly toward male nut C. A central hole 46 extends through nut E and has a diameter smaller than large diameter bore 12 in male nut C but larger than the diameter of small diameter bore 14 in male nut C.

A generally tubular second gland member F having an axial fluid passage therethrough includes an external cylindrical portion 50 closely received through hole 46 in female nut E. A generally radially outward extending shoulder 52 on second gland member F cooperatively engages shoulder 44 on female nut E. A second gland abutment surface 54 is cooperable with first gland abutment surface 30 to provide a sealed fluid flow passage through the gland members. A circumferential groove 56 may be provided in second gland abutment surface 54 for receiving an o-ring. However, instead of an o-ring, it will be recognized that it is possible to interpose a gasket between first and second abutment surfaces 30,54. Therefore, when such abutment surfaces are described as being in abutting relationship, it will be recognized that such terminology includes an arrangement having a gasket or the like interposed between such abutment surfaces.

Second gland member F has an outer cylindrical portion 60 of slightly smaller diameter than large diameter bore 12 in male nut C for reception therein. Axail groove means is provided in second gland member F along the full length of cylindrical portion 60 therein corresponding to the projection means on ring member 36. As shown, a longitudinal groove 62 is dimensioned and positioned for receiving projection 38.

In the construction of FIG. 1, cylindrical portion 60 of second gland member F cannot be inserted into large diameter bore 12 in male nut C unless the groove means thereon matches the projection means on ring member 36. If there is a match, cylindrical portion 60 of second gland member F can be inserted in large diameter bore 12 to the position shown in FIG. 1. Male and female nuts C,E are then engaged, and female nut E is rotated for tightening same. The cooperation between the shoulders on the nuts and their gland members draws the gland members axially together for providing a fluid seal between abutment surfaces 30,54. If the projection means and groove means on a male and female coupling assembly do not match, the dimensions of the parts are such that threads 24,42 on the male and female nuts cannot be engaged, and this makes it impossible to connect a pair of coupling assemblies unless the projection mean is received in a corresponding groove means. The coupling assembly of FIG. 1 can be connected and disconnected with little or no axial movement of first and second gland members D,F, and this means that little or no axial clearance is required. Both male and female nuts C,E are rotatably and axially movable on their respective gland members, and this allows movement of the nuts away from one another to allow lateral movement of one or both gland members laterally into alignment with one another, whereupon the nuts may be moved axially toward one another. Rotation of male nut C on its gland member makes it possible to align the projection means thereon with the groove means in second gland member F so that rotation of the glands is not necessary. This rotational alignment capability for male nut C is also advantageous when second gland member F is welded or otherwise secured in position against rotation.

FIG. 2 shows ring member 36 having a pair of projections 38,38a located directly opposite one another, ie., 180° apart. FIG. 3 shows second gland member F as having a pair of axial grooves 62,62a directly opposite one another. Grooves 62,62a are sized for closely receiving projections 38,38a therein.

FIGS. 4–6 illustrate examples of other keying projection arrangements on other ring members. FIG. 4 shows ring member 36a having keying projections 38a1 and 38a2 located approximately 90° apart. FIG. 5 shows a ring member 36b having keying projections 38b1 and 38b2 located approximately 67° apart. It will be recognized that many other ring members having different angular spacings between the keying projections may be provided, and that more than two keying projections may be used. FIG. 6 shows a ring member 36c having a single keying projection 38c which is substantially wider than the keying projections previously mentioned. A second gland member is provided with groove means corresponding to the arrangement of the projection means shown by way of example in FIGS. 4–6.

FIG. 7 shows a modified male nut member C1 having external threads 24a, and large and small diameter bores 12a,14a. A circumferential recess 34a adjacent outer terminal end 16a receives ring member 36 having opposite keying projections 38,38a. Instead of being welded or otherwise fixed in recess 34a, recess 34a and the axial thickness of ring member 36 are such that terminal end 16a extends outwardly beyond the outer surface of ring member 36. The outer end portion of male nut member C1 is then swaged or otherwise turned inwardly as shown in FIG. 7 to hold ring member 36 in recess 34a. The end portion of male nut C1 may be turned inwardly in such a way that ring member 36 is rotatable relative to male nut C1 to permit alignment of projections 38,38a with corresponding grooves in a gland member in situations where nut C1 is fixed against rotation.

Figure 8:
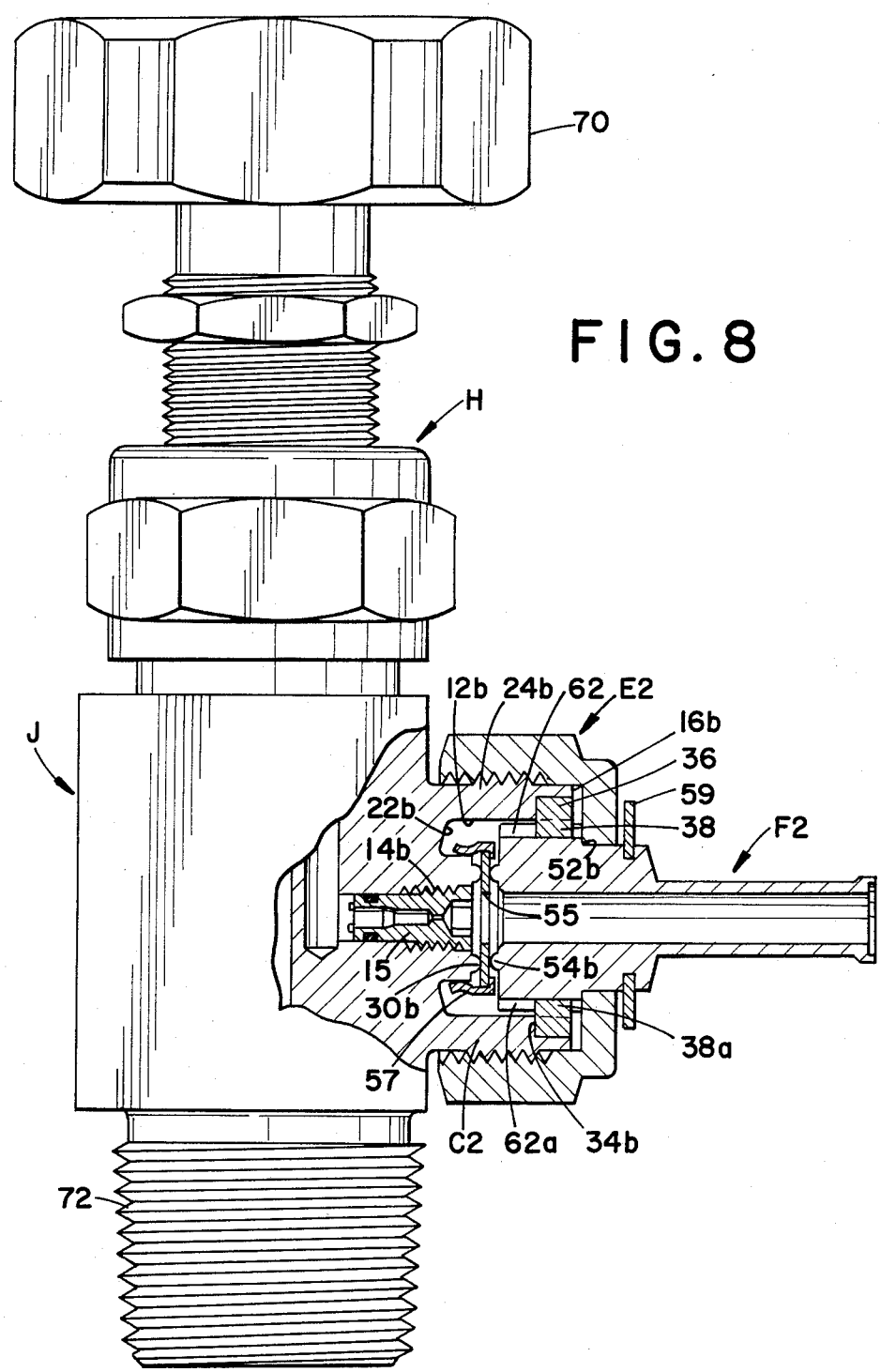
FIG. 8 is an elevational view of a valve having a coded coupling arrangement of the present application incorporated therein, and with portions cut-away and in section for ease of illustration.

FIG. 8 shows a valve H having an operating member 70 for opening and closing same, and including a valve body J having an externally threaded stem 72 defining attaching means for attaching the valve to another device such as a fluid reservoir. Valve body J includes an integral boss C2 extending outwardly therefrom and defining a generally tubular member which extends substantially horizontally when attaching means 72 connects valve H to another device. Generally tubular member C2 has substantially all of the features and characteristics of generally tubular member C of FIG. 1. Large and small diameter bores 12b,14b intersect at an abutment surface 30b which is spaced outwardly from bottom 22b of large diameter bore 12b and spaced radially inward from the peripheral wall of large diameter bore 12b. In the arrangement shown, small diameter bore 14b is threaded along at least a portion of its length for threadably receiving a flow restrictor 15. Inner circumferential recess 34b adjacent outer terminal end 16b has ring member 36 secured therein against rotation, and keying projections 38,38a extend inwardly of large diameter bore 12b and terminate outwardly of abutment surface 30b.

Gland member F2 substantially corresponds with gland member F of FIG. 1, and has an internally threaded female nut E2 corresponding to nut E for cooperation with external threads 24b on generally tubular member C2. Opposite longitudinal grooves 62,62a receive ring member projections 38,38a so the cylindrical portion of second gland member F2 can be received within large diameter bore 12b. Second gland abutment surface 54b cooperates with abutment surface 30b for sealing a gasket 55 positioned therebetween when female nut E2 is tightened on generally cylindrical member C2. A retainer 57 is shown in resilient frictionally gripping relation with the outer peripheral surface of the protuberance on which abutment surface 22b is located. A retainer ring 59 is received in a suitable circumferential groove in gland member F2 on the opposite side of female nut E2 from gland shoulder 52b.

Unlike the arrangement of FIG. 1, the arrangement of FIG. 8 requires substantial relative axial movement between the generally tubular member and the gland member for connecting or disconnecting the coupling. Also, abutment surface 30b of FIG. 8 is on a protuberance integral with valve body J and generally tubular member C2, instead of being on a member separate from the generally tubular member.

Figure 9:
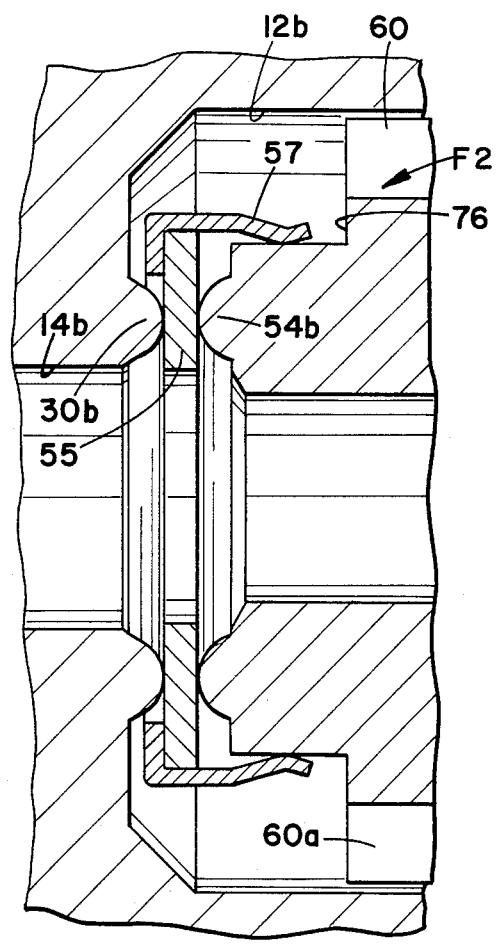
FIG. 9 is a partial cross-sectional elevational view showing another arrangement for use in the valve of FIG. 8; and, FIG. 10 is an elevational view showing a plurality of cylinders having different coded valves thereon for cooperation with different coupling members extending outwardly from a panel.

FIG. 9 shows a slightly modified arrangement in which gland member F2 has an outer circumferential groove or recess 76 therein so that gasket retainer 57 may be placed in resilient frictionally gripping relation with an outer peripheral surface adjacent abutment surface 54b on the gland member instead of on the generally tubular member. The operation and coded arrangements for the embodiments of FIGS. 8 and 9 are otherwise the same as described with reference to FIGS. 1–6. In the embodiment of FIG. 9, abutment surface 30b is not spaced as far outwardly from the bottom of large diameter bore 12b as it is in the embodiment of FIG. 8.

Figure 10:
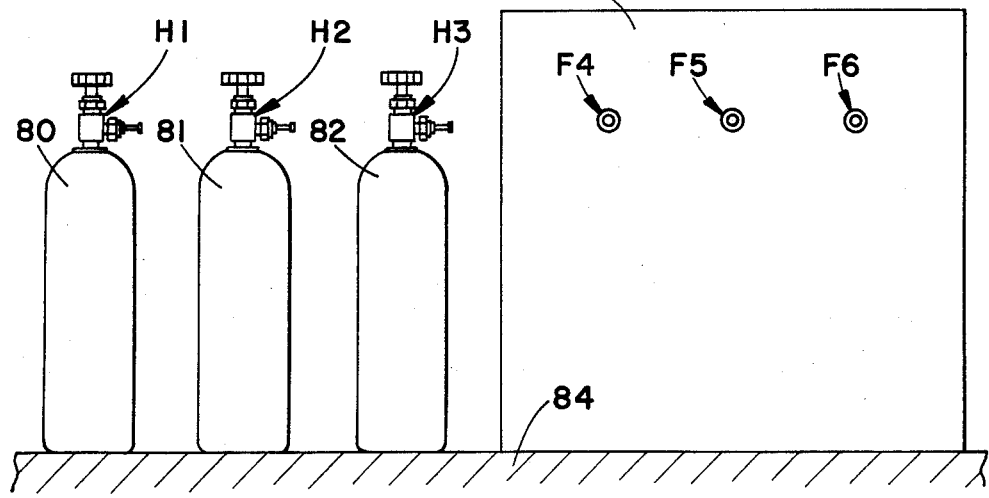

FIG. 10 shows a plurality of fluid reservoirs 80,81,82 which may comprise conventional gas cylinders which contain different pressurized gases and are supported on a supporting surface 84 extending substantially horizontally. Each reservoir or cylinder has a valve H1,H2,H3 attached to the upper portion thereof for selectively releasing fluid therefrom. Valves H1,H2,H3 correspond to the valve of FIGS. 8 or 9, except that each valve has a different keying projection arrangement so it can be cooperatively connected only with a gland member having a corresponding groove arrangement. A cabinet or panel 86 has a plurality of spaced-apart gland members F4,F5,F6 extending substantially horizontally outward therefrom. Gland members F4,F5,F6 are spaced laterally from one another a sufficient distance for allowing reservoirs 80,81,82 to be positioned side-by-side with the valves thereon connected to the glands.

The substantially horizontal extending, generally tubular members on valves H1,H2,H3 are located at substantially the same height above supporting surface 84 as are glands F4,F5,F6. Thus, a reservoir is manipulated into a position adjacent panel or cabinet 86 while supported on support surface 84 until a gland member is received in the generally tubular member shown with reference to FIG. 8. Due to the coded arrangements, each reservoir 80,81,82 can be connected with only one of gland members F4,F5,F6. This insures that the proper fluid will be supplied from the appropriate reservoir through the appropriate gland to the location of use. By way of example only, valve H1 and gland F4 may have the cooperative projection and groove means of FIGS. 2 and 3, valve H2 and gland F5 may have cooperative projection and groove means corresponding to FIG. 4, and valve H3 and gland F6 may have cooperative projection and groove means corresponding to FIG. 5.

Each gland member F4,F5,F6 preferably is welded or otherwise secured in position against rotation, and is so secured during installation in its correct rotated position so that the groove means thereon will be aligned with the appropriate projection means on the appropriate valve when the reservoir is supported in upright position on support surface 84. Thus, no adjustment or relative rotation between the projection and groove means is necessary to connect and disconnect the valves from the glands. This coded system makes it impossible to connect the wrong fluid reservoir to a gland because only one valve will connect with each gland.

Like the arrangement of FIG. 1, the arrangement of FIG. 8 is such that the external threads on generally tubular member C2 will not engage with the internal threads on female nut E2 unless the projection means is received in the axial groove means. In addition to the coded projection and groove means, it will be recognized that it is also possible to color code the male and female coupling assemblies or the valves and glands so that common colors are provided on the couplings having corresponding projections and axial grooves. Instead of using colors, it is possible to use numbers or letters, or some other type of matching indicia. Such arrangements make it unnecessary for the installer to visually inspect the projection and recess means or to use trial and error in determining which valve corresponds to which gland. However, if an installer attempts to mistakenly connect parts having unmatching indicia codes, the coded projection and groove means of the present invention will not permit the connection to be made.

The invention has been described with reference to preferred embodiments. Obviously, modifications and alterations will occur to those skilled in the art upon a reading and understanding of this specification. It is intended to include all such modifications and alterations insofar as they come within the scope of the appended claims or the equivalents thereof.

Having thus described the invention, it is now claimed:

1. A coded coupling comprising: an externally threaded generally tubular member having a large diameter bore therein and an outer terminal end, said large diameter bore having an inner peripheral surface and a bottom, abutment surface means for cooperation with another member receivable within said large diameter bore, a member which projects axially outwardly from said bottom of said large diameter bore toward said outer terminal end of said generally tubular member in radially inwardly spaced relationship to said inner peripheral surface on said large diameter bore, said abutment surface means being on said outwardly projecting member, an axial fluid passage through said member on which said abutment surface means is defined, said abutment surface means facing outwardly toward said outer terminal end of said generally tubular member in surrounding relationship to said axial fluid passage, projection means for reception in axial groove means on another member receivable in said large diameter bore of said generally tubular member, said projection means being located adjacent said terminal end of said generally tubular member and extending radially inwardly of said inner peripheral surface and terminating radially outwardly of said abutment surface means, and said abutment surface means being located substantially closer to said bottom of said large diameter bore than to said outer terminal end of said generally tubular member.

2. The coupling as defined in claim 1 wherein said member having said abutment surface means thereon comprises a protuberance which is integral with said generally tubular member.

3. The coupling as defined in claim 1 wherein said generally tubular member comprises an integral boss projecting outwardly from a valve body.

4. The coupling as defined in claim 1 wherein said member on which said abutment surface means is defined comprises a gland member separate from and received within said generally tubular member.

5. The coupling as defined in claim 1 including a gland member having a fluid passage therethrough and external axial groove means for receiving said projection means, said gland member being receivable within said generally tubular member and having a gland end portion cooperable with said abutment surface means, an internally threaded nut received on said gland member for threaded engagement with said externally threaded generally tubular member, said nut and gland member having cooperable shoulders for moving said gland member axially toward said abutment surface means when said nut is tightened on said generally tubular member.

6. The coupling as defined in claim 5 wherein said nut is threadably engageable with said external threads on said generally tubular member only when said projection means is received in said groove means.

7. The coupling as defined in claim 1 including an inner circumferential recess in said generally tubular member at said outer terminal end thereof, a ring member secured in said recess, and said projection means being on said ring member.

8. The coupling as defined in claim 7 wherein said ring member is non-rotatably secured in said recess.

9. The coupling as defined in claim 1 wherein said externally threaded member is part of a valve body having attaching means for attaching same to a reservoir of pressurized fluid with said generally tubular member extending substantially horizontal.

10. A valve having a coded coupling connection comprising: a valve body having an integral generally tubular member extending outwardly therefrom, said generally tubular member having a through passage defined by concentric large and small diameter bores, said generally tubular member having external threads thereon and a free terminal end through which said large diameter bore opens outwardly, said large diameter bore having a bottom and a peripheral wall, a projection extending axially outwardly from said bottom in inwardly-spaced relationship to said peripheral wall, said projection terminating in an abutment surface which faces outwardly toward said free terminal end of said generally tubular member, said small diameter bore extending axially through said projection and being surrounded by said abutment surface, keying projection means for reception in axial groove means in another member receivable in said large diameter bore, and said keying projection means being located adjacent said terminal end of said generally tubular member and extending generally radially inward of said large diameter bore.

11. The valve as defined in claim 10 wherein said valve body includes attaching means for attaching same to a reservoir of pressurized fluid with said generally tubular member extending substantially horizontal.

12. The valve as defined in claim 10 wherein said generally tubular member has a circumferential recess therein adjacent said terminal end and including a ring member secured in said recess, said projection means being on said ring member.

13. A coded coupling comprising: a generally tubular member having a through passage formed by concentric large and small diameter bores, said generally tubular member having a free terminal end at which said large diameter bore opens outwardly and being externally threaded along at least a portion thereof outwardly of said large diameter bore, said generally tubular member having an internal circumferential recess therein adjacent said terminal end thereof, a ring member received in said recess and being attached to said generally tubular member, keying projection means for reception in another member receivable in said large diameter bore, and said keying projection means extending inwardly of said large diameter bore adjacent said terminal end; and, wherein said large and small diameter bores intersect at an internal shoulder and including a tubular flange member closely received in said small diameter bore in said generally tubular member and having an outwardly extending gland shoulder adjacent one end portion thereof received in said large diameter bore for cooperating abutment with said internal shoulder.

14. A coded coupling comprising: a generally tubular member having a through passage formed by concentric large and small diameter bores, said generally tubular member having a free terminal end at which said large diameter bore opens outwardly and being externally threaded along a least a portion thereof outwardly of said large diameter bore, said generally tubular member having an internal circumferential recess therein adjacent said terminal end thereof, a ring member received in said recess and being attached to said generally tubular member, keying projection means for reception in another member receivable in said large diameter bore, and said keying projection means extending inwardly of said large diameter bore adjacent said terminal end; and, including a gland member closely receivable in said large diameter bore and having external longitudinal groove means for receiving said projection means, and an internally threaded captive nut on said gland member for threaded engagement with said external thread on said generally tubular member when said keying projection means is received in said groove means.

15. The coupling as defined in claim 14 wherein said threads on said nut and said generally tubular member are not engageable unless said keying projection means is received in said groove means.

16. A coded coupling comprising: a generally tubular member having a through passage formed by concentric large and small diameter bores, said generally tubular member having a free terminal end at which said large diameter bore opens outwardly and being externally threaded along at least a portion thereof outwardly of said large diameter bore, said generally tubular member having an internal circumferential recess therein adjacent said terminal end thereof, a ring member received in said recess and being attached to said generally tubular member, keying projection means for reception in another member receivable in said large diameter bore, and said keying projection means extending inwardly of said large diameter bore adjacent said terminal end; and, wherein said generally tubular member has a non-circular external shape along at least a portion thereof outwardly of said small diameter bore, and said portion of non-circular external shape having a cross-sectional size substantially greater than the cross-sectional size of said externally threaded portion.

17. A coded coupling comprising: a pair of cooperable coupling assemblies having cooperable male and female nut members for connecting said assemblies, said male nut on one assembly having inwardly extending projection means for reception in outwardly opening longitudinal groove means in the other said assembly, said other assembly having longitudinal groove means for receiving said projection means, said nuts being cooperatively engageable only when said projection means is received in said groove means, each said coupling assembly including a body on which said nuts are mounted, and each of said male and female nut members being movable rotatably and longitudinally relative to its respective body.

* * * * *